US007870386B2

(12) United States Patent
Forlenza et al.

(10) Patent No.: US 7,870,386 B2
(45) Date of Patent: Jan. 11, 2011

(54) METHOD FOR PERMANENT DECRYPTION OF SELECTED SECTIONS OF AN ENCRYPTED DOCUMENT

(75) Inventors: Randolph Michael Forlenza, Austin, TX (US); Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1748 days.

(21) Appl. No.: 10/835,502

(22) Filed: Apr. 29, 2004

(65) Prior Publication Data

US 2005/0246526 A1 Nov. 3, 2005

(51) Int. Cl.
*H04L 29/06* (2006.01)

(52) U.S. Cl. .................................................. 713/165
(58) Field of Classification Search ................. 713/165
See application file for complete search history.

(56) References Cited

U.S. PATENT DOCUMENTS

| | | | |
|---|---|---|---|
| 4,782,529 A | 11/1988 | Shima | |
| 5,157,763 A | 10/1992 | Peters et al. | |
| 5,212,784 A | 5/1993 | Sparks | |
| 5,267,313 A | 11/1993 | Hirata | |
| 5,541,997 A | 7/1996 | Pappas et al. | |
| 5,673,316 A | 9/1997 | Auerbach et al. | 380/4 |
| 5,933,498 A | 8/1999 | Schneck et al. | |
| 6,023,506 A | 2/2000 | Ote et al. | |
| 6,339,825 B2 | 1/2002 | Pensak et al. | 715/158 |
| 6,345,256 B1 | 2/2002 | Milsted et al. | 705/1 |
| 6,449,721 B1 | 9/2002 | Pensak et al. | 713/171 |
| 6,598,161 B1 * | 7/2003 | Kluttz et al. | 713/166 |
| 6,631,482 B1 | 10/2003 | Marks | |
| 6,651,171 B1 | 11/2003 | England et al. | |
| 6,868,495 B1 | 3/2005 | Glover | |
| 6,920,567 B1 * | 7/2005 | Doherty et al. | 726/22 |
| 6,941,459 B1 | 9/2005 | Hind et al. | |
| 6,954,532 B1 | 10/2005 | Handley et al. | |
| 7,003,664 B2 | 2/2006 | Kori | |

(Continued)

FOREIGN PATENT DOCUMENTS

WO WO0201271 A1 1/2002

OTHER PUBLICATIONS

U.S. Appl. No. 12/001,475, filed Dec. 11, 2007, First Named Inventor Randolph Michael Forlenza; Confirmation No. 3221.

(Continued)

*Primary Examiner*—Nasser Moazzami
*Assistant Examiner*—Michael S McNally
(74) *Attorney, Agent, or Firm*—Schmeiser, Olsen & Watts; William H. Steinberg

(57) ABSTRACT

The present invention allows the viewer of a document to select certain portions of an encrypted document for decryption and optionally re-encryption while other portions of the document remain encrypted or as originally created. In this decryption process, the user would use a standard word processing editor technique to highlight (or swipe) portions of a document that the user desires to decrypt. The highlighted area would then be 'tagged' with a surrounding attribute indicating that the highlighted area is to be decrypted. This process is similar to the existing word processor capability to highlight areas on a document and then assign rich text attributes, such as BOLD, ITALICS, etc., to those areas.

18 Claims, 5 Drawing Sheets

U.S. PATENT DOCUMENTS

| | | | |
|---|---|---|---|
| 7,103,915 | B2 | 9/2006 | Redlich et al. |
| 7,178,033 | B1 | 2/2007 | Garcia |
| 7,322,047 | B2 | 1/2008 | Redlich et al. |
| 7,346,769 | B2 | 3/2008 | Forlenza et al. |
| 7,484,107 | B2 | 1/2009 | Forlenza et al. |
| 7,600,183 | B2 | 10/2009 | Stern et al. |
| 2002/0051545 | A1* | 5/2002 | Ogilvie .................. 380/280 |
| 2002/0083325 | A1* | 6/2002 | Mediratta et al. .......... 713/182 |
| 2002/0159594 | A1 | 10/2002 | Kori |
| 2003/0021412 | A1* | 1/2003 | Candelore et al. .......... 380/217 |
| 2003/0110131 | A1 | 6/2003 | Alain et al. |
| 2003/0179412 | A1 | 9/2003 | Matsunoshita |
| 2004/0025019 | A1* | 2/2004 | Watanabe et al. .......... 713/168 |
| 2004/0123126 | A1 | 6/2004 | Lee |
| 2005/0071657 | A1* | 3/2005 | Ryan .................. 713/193 |

OTHER PUBLICATIONS

U.S. Appl. No. 12/135,321, filed Jun. 9, 2008, First named Inventor Randolph Michael Forlenza; Confirmation No. 3528.

Office Action (Mail Date Oct. 7, 2009) for U.S. Appl. No. 12/001,475, filed Dec. 11, 2007, First Named Inventor Randolph Michael Forlenza et al.; Confirmation No. 3221.

Jan. 4, 2010 Response to Office Action (Mail Date Oct. 7, 2009) for U.S. Appl. No. 12/001,475, filed Dec. 11, 2007, First Named Inventor Randolph Michael Forlenza et al.; Confirmation No. 3221.

Office Action (Mail Date Feb. 19, 2010) for U.S. Appl. No. 12/001,475, filed Dec. 11, 2007; Confirmation No. 3221.

May 18, 2010 Response to Office Action (Mail Date Feb. 19, 2010) for U.S. Appl. No. 12/001,475, filed Dec. 11, 2007; Confirmation No. 3221.

Office Action (Mail Date Sep. 11, 2009) for U.S. Appl. No. 12/135,321, filed Jun. 9, 2008, Confirmation No. 3528.

Dec. 11, 2009 Response to Office Action (Mail Date Sep. 11, 2009) for U.S. Appl. No. 12/135,321, filed Jun. 9, 2008, Confirmation No. 3528.

Office Action (Mail Date Mar. 5, 2010) for U.S. Appl. No. 12/135,321, filed Jun. 9, 2008; Confirmation No. 3528.

May 3, 2010 Response to Office Action (Mail Date Mar. 5, 2010) for U.S. Appl. No. 12/135,321, filed Jun. 9, 2008; Confirmation No. 3528.

Office Action (Mail Date Jun. 2, 2010) for U.S. Appl. No. 12/001,475, filed Dec. 11, 2007; Confirmation No. 3221.

Office Action (Mail Date Jun. 9, 2010) for U.S. Appl. No. 12/135,321, filed Jun. 9, 2008; Confirmation No. 3528.

Office Action (Mail Date Jan. 30, 2007) for U.S. Appl. No. 10/692,142, filed Oct. 23, 2003; Confirmation No. 9190.

Jul. 10, 2007 Response to Office Action (Mail Date Jan. 30, 2007) for U.S. Appl. No. 10/692,142, filed Oct. 23, 2003; Confirmation No. 9190.

Notice of Allowance (Mail Date Oct. 31, 2007) for U.S. Appl. No. 10/692,142, filed Oct. 23, 2003; Confirmation No. 9190.

Office Action (Mail Date Apr. 29, 2008) for U.S. Appl. No. 10/824,806, filed Apr. 15, 2004; Confirmation No. 6685.

Jun. 10, 2008 Response to Office Action (Mail Date Apr. 29, 2008) for U.S. Appl. No. 10/824,806, filed Apr. 15, 2004; Confirmation No. 6685.

Notice of Allowance (Mail Date Sep. 17, 2008) for U.S. Appl. No. 10/824,806, filed Apr. 15, 2004; Confirmation No. 6685.

* cited by examiner

METHOD FOR PERMANENT DECRYPTION OF SELECTED SECTIONS OF AN ENCRYPTED DOCUMENT

FIELD OF THE INVENTION

The present invention provides a method and system for protecting and securing electronic documents and in particular to a method and system for permanently decrypting selected portions of an encrypted document while leaving the remaining portions of the document unchanged.

BACKGROUND OF THE INVENTION

The present day computer systems can enable a user to create various types of documents. These documents can contain text, graphics, images or a combination of each. Many times the creator of a document for various reasons desires to keep secret the contents of a document. Security is a primary reason to keep document contents secret. In many businesses, various types of documents that exist on computer systems contain confidential information that can be related to the company's trade secrets and business strategies. Most technology related companies maintain much of their research and product development information on computer systems that are protected by elaborate security systems. Governmental agencies also maintain much of their documented information on a confidential basis. Even individuals keep important records and other information in confidential files.

Often, it is necessary to share documentation that contains confidential information with persons. Presently, there are various ways to secure the documents and prevent unauthorized persons from viewing the contents of a document. One way to protect documents is to zip the document in a secured file that can be password protected. In this approach, when someone desires to access the document, that person must first submit the proper password. If the password is correct, the document is retrieved and displayed for the requesting viewer. During transmission of a document over a computing network such as the Internet, the document can be attached to an electronic message and transmitted with the message. The receiver of the message can download the attachment and with the proper password, retrieve the attached and secured document.

In other situations, a person must show that they have authority to access a computing network from which one can access certain confidential information. These systems typically exist in financial settings such as accessing bank or credit accounts.

A third technique used today to secure the contents of a document is to encrypt the document contents. In this approach, the document would be encrypted and stored by the document creator. To access the document, one would need to have the proper decryption key(s). In many cases, the documents would be transmitted over a computing network to a destination location. The encryption would serve to secure the document during the transmission of the document over the network. Again, at the destination location, decryption would occur using the appropriate decryption keys.

One disadvantage is that the current document security systems are all or nothing propositions. With reference to document encryption, today, the only known means of encrypting certain elements of a document is to encrypt the entire document. Encrypting an entire document is costly, especially when only certain parts of the document (for example, personal user name, telephone, address, and credit card numbers in an order) actually need the security that encryption provides. Furthermore, the process of encrypting the document is usually inconvenient, at best, requiring the user isolate it as a separate file and then invoking a suitable tool for encrypting it. Furthermore, when one reviews a document containing encrypted sections, there may be a desire to permanently decrypt one or more portions of an encrypted document.

As mentioned, currently, document security is an all or nothing task. There remains a need for a document security system in which a user could select only specified portions of an encrypted document for permanent decryption and further re-encryption, while displaying other portions of the document in a current encrypted or decrypted state.

SUMMARY OF THE INVENTION

It is an objective of the present invention to provide a method for selectively decrypting encrypted portions of a document.

It is a second objective of the present invention is to provide a method for maintaining the security of an encrypted document through selective decrypting and re-encrypting of sections of a document.

It is a third objective of the present invention is to provide for a method for changing the security of a document through the process of selectively decrypting portions of an encrypted document and then re-encrypting the decrypted section using one or more different encryption keys.

The present invention allows the viewer of a document to select certain portions of an encrypted document for decryption and optionally re-encryption while other portions of the document remain encrypted or as originally created. In this decryption process, the user would use a standard word processing editor supporting this capability or technique to highlight (or swipe) portions of a document that the user desires to decrypt. The highlighted area would then be 'tagged' with a surrounding attribute indicating that the highlighted area is to be decrypted. This process is similar to the existing word processor capability to highlight areas on a document and then assign rich text attributes, such as BOLD, ITALICS, etc., to those areas.

In this method, the selected encrypted areas of a document would be decrypted in accordance with conventional decryption schemes. When the document is displayed if the appropriate decryption keys are offered, the decrypted areas are converted back to text and displayed as they were originally written. If the decryption keys are not offered or are incorrect, the target areas are displayed as gibberish to maintain placement of objects in the surrounding parts of the document or a message or graphic is substituted indicating decryption failed.

After viewing the decrypted information, the user may desire to re-encrypt the information. This desire may be to allow other persons not able to decrypt the information to view it. Usually, this case would be where the user has decided to change the access/security level for viewing the encrypted information. The re-encryption process would be similar to the initial encryption method. The initial encryption process would enable the user to encrypt specific parts or sections of a document while leaving other document section unchanged.

DETAILED DESCRIPTION OF THE INVENTION

The present invention uses decryption and encryption techniques to decrypt and then provide the possibility to re-encrypt selective portions of a document. These decryption schemes transform encrypted data into a format that is readable when decrypted using predetermined decryption keys. User authentication and Data Encryption schemes provide the ability to authenticate, encrypt, decrypt, and re-encrypt certain information. This present invention can implement a public key/private key encryption and decryption schemes to protect data as it is displayed or as it traverses across public networks. In the present invention, the creator of a document can select a section of the document and have multiple encryption keys used on that document section. Anyone attempting to access an encrypted section of the document will need at least one of the keys for that encrypted section. The decryption and re-encryption methods of the present invention are implemented in conjunction with the selective document encryption methods described in U.S. patent application Ser. No. 10/692,142 by the same inventors and to the same assignee explains much of the technology concerning the encryption of documents. Those document encryption descriptions are incorporated herein by reference.

Figure 1:
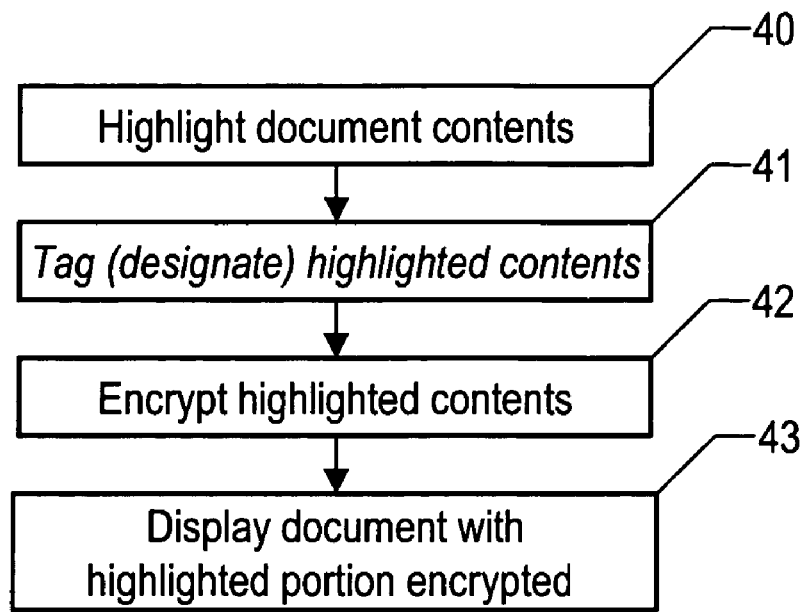
FIG. 1 is a flow diagram of the general method for implementing the concepts of the present invention.
Figure 7:
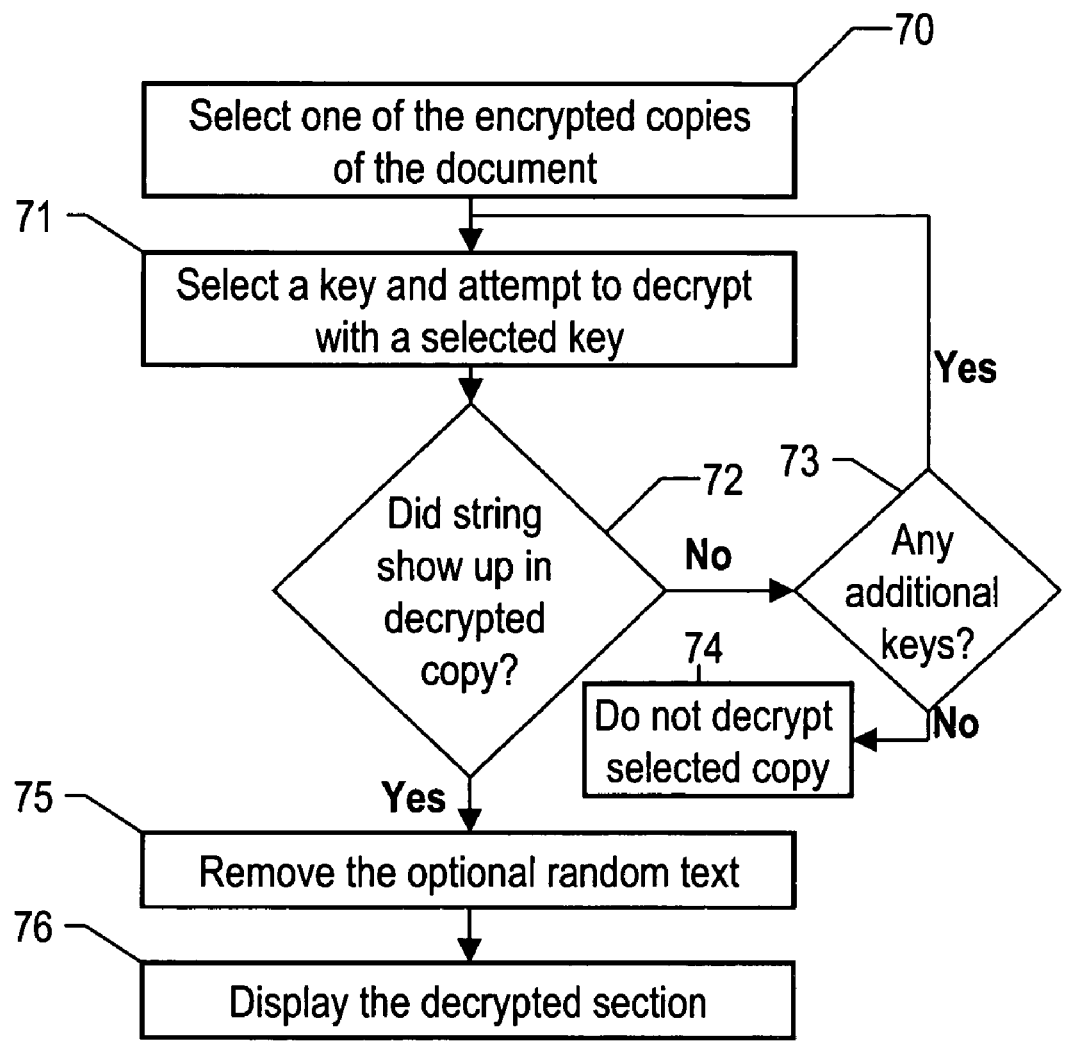
FIG. 7 is a flow diagram of the decryption techniques of the present invention for selective of multiple portions of an encrypted using attached character strings to detect a successful decryption of a document.

Referring now to FIG. 1, shown is a flow diagram of the general method for implementing the concepts of the present invention. In the process, a user has received a document containing one or more encrypted sections. The encrypted sections will not be readable. If unencrypted sections are in the document, these sections will be readable. In accordance with this invention, in step 10, the user can highlight a desired portion of the document for decryption. This process is the same as highlighting for other purposes such as to BOLD, UNDERLINE or ITALICIZE a portion of the document. In a typical highlighting process, the highlighting is accomplished by holding the mouse button down and moving the cursor, (also called "dragging" or "swiping"), over the text that the user desires to highlight. As the cursor moves over text, all text covered by the cursor is indicated on the screen. When the user releases the button, no further text is highlighted with that particular cursor movement. The next step, 11, would be to initialize the decryption process of the present invention. As with other functions, the user could click DECRYPT icon, shown in FIG. 2, to initiate decryption process. In this decryption process, after the user has highlighted the desired text, the user will then select the encryption key for the encrypted information. As mentioned the user can click the DECRYPT icon. At this point, a pop-up menu can appear to enable the user to choose the decryption key to use in the decryption process. Another key selection method could be for the word processor or other tool being used to prompt the user for the key that will be used to decrypt the highlighted portion of the document. One additional option could be to specify several keys to be used (presumably to target different sets of ultimate readers) so that when a portion of the document is highlighted, an internal process will begin trying each key of the user until the appropriate key is found. This approach provides some security against person looking over the shoulder of the reader and observing the key. In this method, the reader would also enter a name for the key initially and this name would be displayed for each pre-entered key. Still another approach would be to always show the last 10 or so keys entered (by name) similar to one opens a new document, where the user has the option of choosing one of several recently edited documents. After receiving the decryption key, the highlighted portion of the document would be decrypted in step 12 using the decryption routines available for that word processor. Following the decryption process, in step 13, the document is displayed containing the now decrypted portions. After view the document contents, the user may desire to re-encrypt the decrypted section of the document. The user will have that option as illustrated in FIG. 7, which will be described herein.

Figure 2:
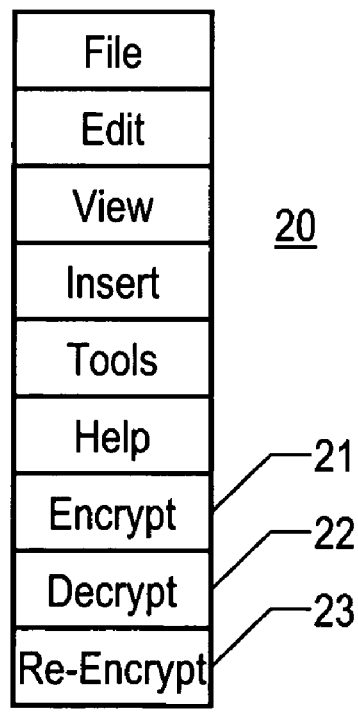
FIG. 2 is a pop-up menu of a word processor program containing the DECRYPT icon of the present invention.

Referring to FIG. 2, shown is an illustration of a pop-up menu 20 containing icons for various conventional word processing functions. In addition, this menu 20 contains encryption, decryption and re-encryption functions that are used in the implementation of the present invention. In this menu is an ENCRYPT icon 21. In addition, the menu will also contain a DECRYPT icon 22 and a RE-ENCRYPT icon 23 that can initiate processes when the user desires to decrypt and/or re-encrypt a portion of the document.

Figure 3:
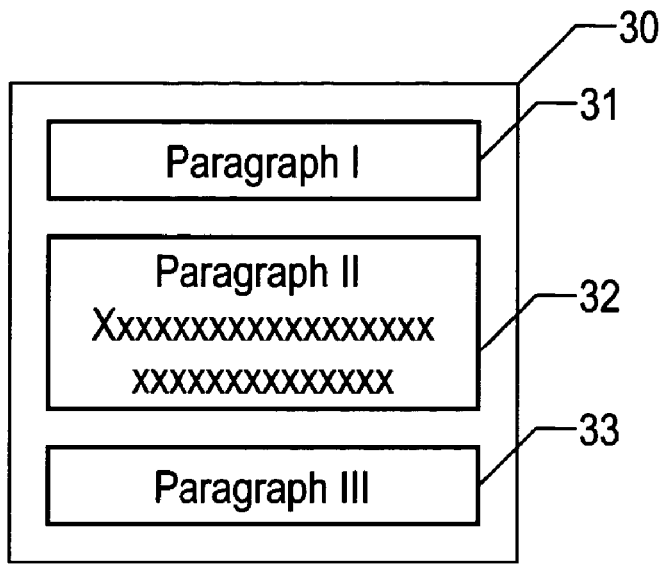
FIG. 3 is an illustration of the document containing an encrypted section in accordance with the method of the present invention.

Referring to FIG. 3, shown is a document 30 with two unencrypted paragraphs 31 and 33 and an encrypted paragraph 32. This document would be processed using the techniques of described in U.S. patent application Ser. No. 10/692,142. During a viewing session a user may desire to decrypt the contents of paragraph 32. In this situation, the user can highlight part or all of that paragraph and click the DECRYPT icon 22. The decryption process will then decrypt and display the document with the highlighted contents in readable form. Although the highlighted content is in a decrypted and readable form, at this point, the highlighted content is not permanently decrypted and therefore the source document or file is not in writable form.

Figure 4:
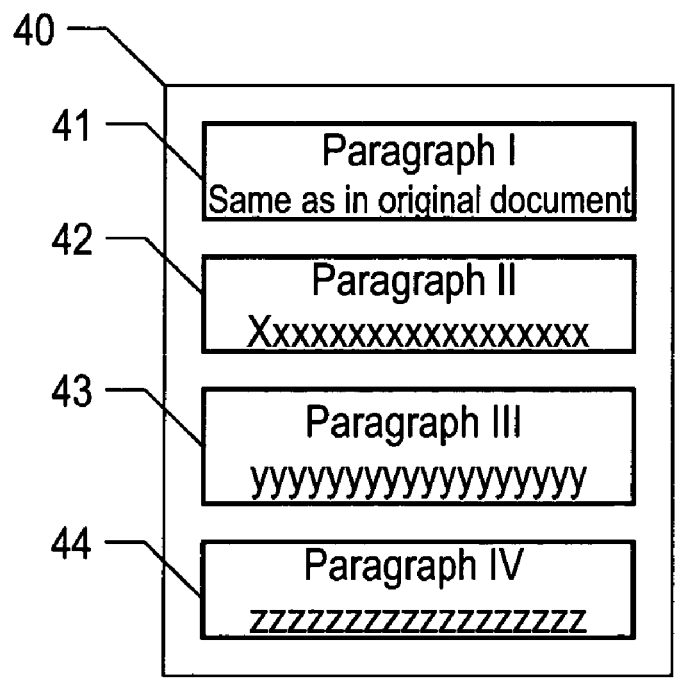
FIG. 4 is an illustration of the document with selected areas with each area having a unique and separate encryption from the other encrypted areas of the document.

FIG. 4 is an illustration of the document 40 having selected areas with each area having a unique and separate encryption from the other encrypted areas of the document. As shown, paragraph 41 did not change from the original paragraph. Paragraphs 42, 43 and 44 were each encrypted with a different encryption key. The different encryption keys would serve as a security mechanism to control access to each encrypted paragraph. For instance, some persons may be able to access all three paragraphs, while others may only be able to access one or two encrypted paragraphs. In this example, the appropriate people would know the correct keys to apply to decrypt the information for which they have authority to read.

Figure 5:
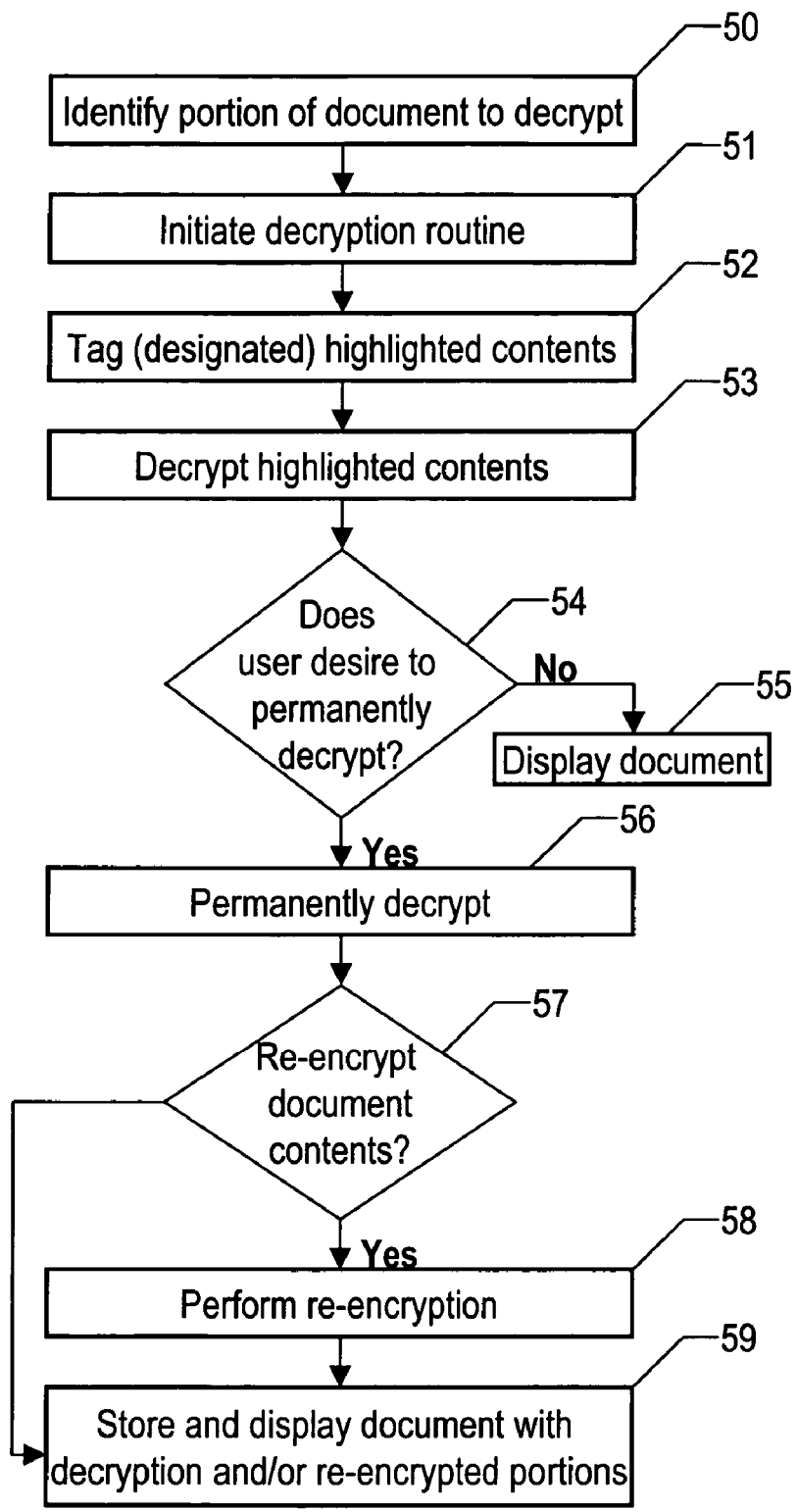
FIG. 5 is a flow diagram of the method of the present invention in which the decryption function is accomplished using decryption techniques at the location in the document of the selected information.

Referring to FIG. 5, shown are the steps in the document decryption process of the present invention. In step 50 of this method the user will select and highlight a section of the document that the user wants to decrypt. At this point, the portion of the document to be decrypted is highlighted on the screen and viewed by the user. In step 51, the user can initiate the decryption routine. Clicking the decryption icon 22 shown in FIG. 2 can do this initiation process. Within this routine, step 52 will tag the previously highlighted portion of the document and designate it for decryption. If the user is authorized to review the document contents, step 53 will perform the decryption of the highlighted information using decryption techniques such as several conventional and well-known decryption techniques. In addition, if authorized, the user can decide to permanently decrypt that portion of the document in step 54.

Viewing the document in a decrypted form is not the same as permanently decrypting the document portion. Viewing the document is a read-only status. Permanent decryption can involve the right to edit the document. If the user has the authority to permanently decrypt, step 54 will determine whether the user desires to permanently decrypt that decrypted portion of the document. If the user does not desire to permanently decrypt the document, the document is displayed in step 55. If the user does desire to permanently decrypt the selection portion of the document, that process occurs in step 56. Step 57 gives the user the option to re-encrypt the permanently decrypted portion of the document. If the user desires to re-encrypt that portion of the document, step 58 performs the re-encryption process. This re-encryption process can be the same or similar to the encryption processes described in U.S. patent application Ser. No. 10/692,142. This re-encryption process can also be initiated by clicking the RE-ENCRYPT icon 23 shown in FIG. 2. If there were any changes to the encryption of that section of the document, (permanent decryption or re-encryption), that portion of the document is stored and displayed in the new permanently decrypted or new re-encrypted form in step 59. At the completion of the decryption process, the user can continue to edit the document and decrypt and encrypt other portions of the document as the user desires using the steps of FIG. 5.

Figure 6:
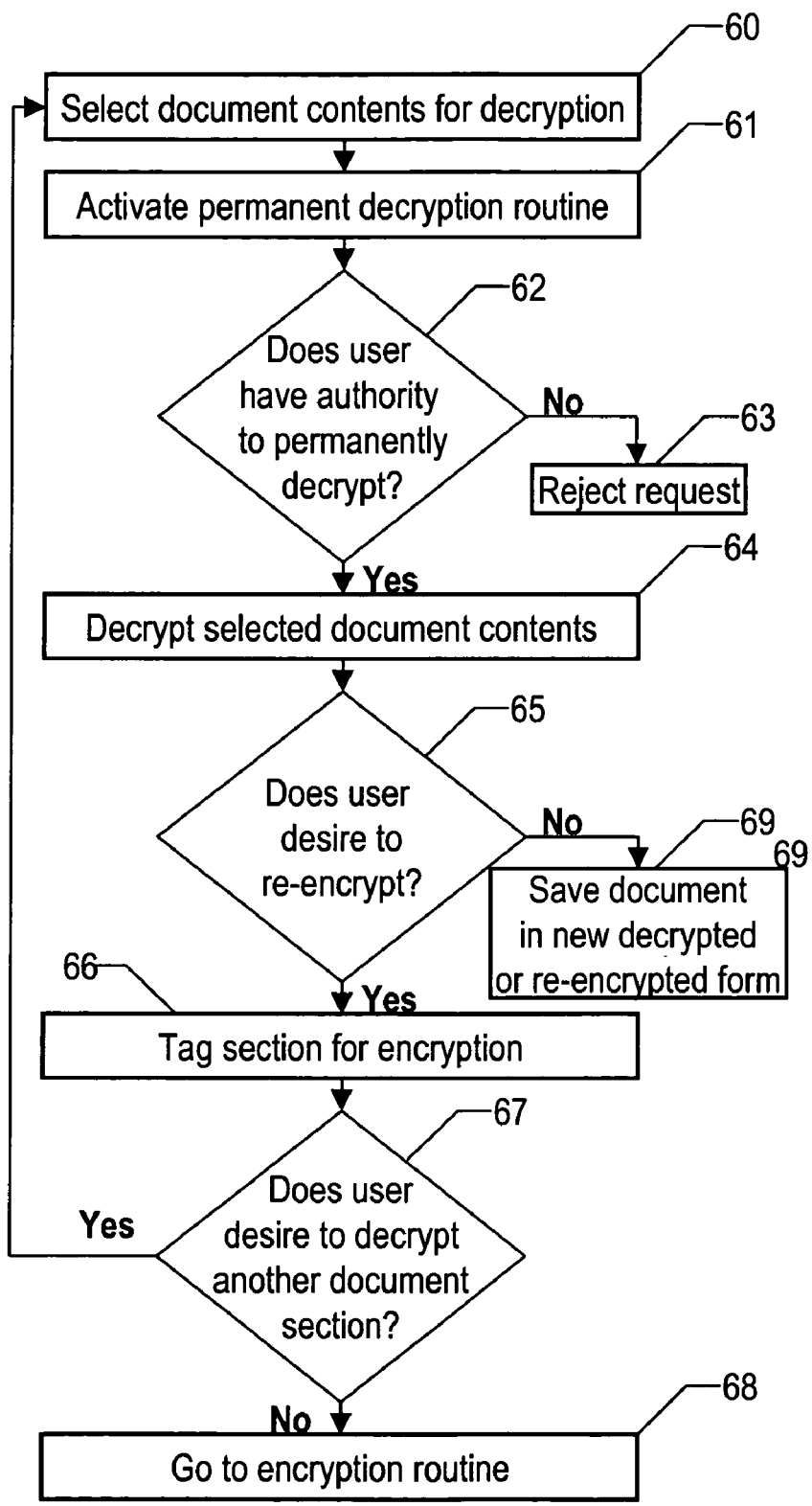
FIG. 6 is a flow diagram of the method of the present invention to permanently decrypt an initially encrypted portion of a document and then re-encrypt the decrypted portion of the document.

FIG. 6 is a flow diagram of the steps of the present invention in which the user may desire to re-encrypt a section of the document. With regard the encryption, this process has already occurred with techniques such as those described in the previously mentioned U.S. patent application Ser. No. 10/692,142. FIGS. 3 and 4 illustrate examples of these encrypted documents. In this process illustrated in FIG. 6, the user may desire to re-encrypt a previously decrypted section of the document or to just remove the encryption and make this section of the document unencrypted. The user in step 60 will select the document contents for decryption. Generally, this selection will be document section such as section 42 in FIG. 4. The section selection process can be in the form of highlighting the desired section as previously described. The user activates the decryption routine. After reviewing the contents of this decrypted portion of the document, the user may desire to permanently decrypt that portion. In this instant, the permanent decryption routine is activated in step 61. This activation can be by clicking a DECRYPT icon 22 from a desktop or popup menu 20. Because this act of permanent decryption my have security implications, step 62 makes a determination of whether the user has the authority to permanently decrypt the selected document contents. If the determination is that the user does not have the authority to permanently decrypt that document section, the decryption attempt is rejected in step 63. If the determination is that the user does have the authority to permanently decrypt, the process moves to step 64 where the highlighted contents of the document is permanently decrypted. This decryption process can involve decrypting the document section and removing the encryption key required from the user for that section from the document. When a user simply views the document, the encryption key remains on the document. At this point, the document content is no longer encrypted. Step 65 gives the user the opportunity to re-encrypt that section of the document. This re-encryption would be the same or similar to the initial document encryption process. If the user does not desire to re-encrypt this section of the document, the new document is saved in the current form. If the user desires to re-encrypt that section of the document, step 66 tags that section for encryption. In this illustration, all of the document sections that are to be re-encrypted are tagged for re-encryption at the same time. However, the document section re-encryption process can occur immediately at step 66. Because the document can have multiple encrypted sections, as shown in FIG. 4, step 67 determines whether the user desires to permanently decrypt another section of the document. If the user does desire to re-encrypt another section, the process returns to step 60. If the user does not desire to re-encrypt another document section, the process moves to step 68 where the tagged sections are re-encrypted. Step 69 saves this re-encrypted document in a new encrypted form.

Referring to FIG. 7, shown is a flow diagram of the steps involved in the decryption of the document using the known character string to verify the success of the decryption. In step 70, one of the encrypted sections of the document is selected for decryption. For purposes of this description, section A is the section for which decryption is desired. Step 71 will select a key from the list of supplied keys to use in an attempt to decrypt this section A. Step 72 determines whether the decryption process was successful. Attempting to read the known character string does this determination. If the string appears in the decrypted copy, then the key was correct and the decryption was successful. If the string does not appear in the decrypted copy, then the decryption was not successful. At this point, step 73 determines whether the user has additional keys to use in an attempt to decrypt that section A of the document. If the user has additional keys, the process returns to step 71 and repeats steps 71 and 72. If in step 73, the user does not have additional keys and the decryption attempt was not successful, then that section of the document will not be decrypted for that user in step 74. Referring to step 72, if the decryption was successful, the process moves to step 75 where both the known character string and the random character string (if one was added) are removed from the text and the text is displayed for the user in step 76.

Furthermore, if a section of the document is supposed to be decryptable with more than one key, then multiple copies of that section would be included in the document file, each copy encrypted with a different key. There would of course be some tag information that indicated that the particular section is duplicated and encrypted with different keys. This would be used to have some parts of the document encrypted for department A viewing, for example, and other non-disjoint parts for viewing by department B. Additionally, tag information may have been added to indicate the text space consumed by the decrypted plain text. This would have been used to more properly format an unencrypted portion so that surrounding information is not displaced from its original page or position in the document. In addition, when a section of the document has multiple copies, each encrypted with a different key, if that encrypted section is permanently decrypted, then all of the encrypted copies are removed and only the plain text of that section is retained in the document file.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, floppy disc, hard disk drive, RAM, and CD-ROMs.

We claim:

1. A method for selective decryption within an encrypted document, said method comprising:
    detecting an encrypted portion of a document, said encrypted portion having been selected and marked for decryption, said encrypted portion being an encryption of a text portion of the document, said text portion comprising a known character string that had been added to the text portion prior to the text portion being encrypted;
    receiving a selection of a valid key configured to decrypt the encrypted portion;
    ascertaining that an attempt to convert the encrypted portion into a decrypted portion of the document by decrypting the encrypted portion using the valid key was successful, said ascertaining comprising determining that the decrypted portion includes the known character string;
    in response to said ascertaining, removing the known character string from the decrypted portion; and
    after said removing the known character string, displaying the encrypted portion.

2. The method of claim 1, said text portion comprising both said known character string and a random character string that had been added to the text portion prior to the text portion being encrypted, wherein the method further comprises:
    in further response to said ascertaining, removing the random character string from the decrypted portion.

3. The method of claim 1, wherein the document comprises multiple copies of the encrypted portion, wherein each copy of the multiple copies is encrypted with a different encryption key, wherein said decrypting the encrypted portion comprises permanently decrypting the encrypted portion resulting in the decrypted portion being permitted to be edited, and wherein the method further comprises:
    in response to said ascertaining, removing from the document each copy of the multiple copies of the encrypted portion such that only plain text of the decrypted portion is retained in the document.

4. The method of claim 1, wherein said decrypting the encrypted portion comprises decrypting the encrypted portion resulting in the decrypted portion being in read-only status and not being permitted to be edited.

5. The method of claim 1, wherein the method further comprises:
    receiving a selection of multiple keys; and
    selecting the key by attempting to decrypt the encrypted portion successively with each key of the multiple keys until said ascertaining has been has been performed with the valid key.

6. The method of claim 1, wherein said receiving the selection of a valid key comprises:
    presenting to a user an identification of a plurality of keys previously entered to open a corresponding plurality of documents; and
    receiving from the user the selection of the valid key from the plurality of keys.

7. A computer program product, comprising a computer readable storage medium having a computer readable program code stored therein, said program code configured to be executed by a data processing system to implement a method for selective decryption within an encrypted document, said method comprising:
    detecting an encrypted portion of a document, said encrypted portion having been selected and marked for decryption, said encrypted portion being an encryption of a text portion of the document, said text portion comprising a known character string that had been added to the text portion prior to the text portion being encrypted;
    receiving a selection of a valid key configured to decrypt the encrypted portion;
    ascertaining that an attempt to convert the encrypted portion into a decrypted portion of the document by decrypting the encrypted portion using the valid key was successful, said ascertaining comprising determining that the decrypted portion includes the known character string;
    in response to said ascertaining, removing the known character string from the decrypted portion;
    after said removing the known character string, displaying the decrypted portion.

8. The computer program product of claim 7, said text portion comprising both said known character string and a random character string that had been added to the text portion prior to the text portion being encrypted, wherein the method further comprises:
    in further response to said ascertaining, removing the random character string from the decrypted portion.

9. The computer program product of claim 7, wherein the document comprises multiple copies of the encrypted portion, wherein each copy of the multiple copies is encrypted with a different encryption key, wherein said decrypting the encrypted portion comprises permanently decrypting the encrypted portion resulting in the decrypted portion being permitted to be edited, and wherein the method further comprises:
    in response to said ascertaining, removing from the document each copy of the multiple copies of the encrypted portion such that only plain text of the decrypted portion is retained in the document.

10. The computer program product of claim 7, wherein said decrypting the encrypted portion comprises decrypting the encrypted portion resulting in the decrypted portion being in read-only status and not being permitted to be edited.

11. The computer program product of claim 7, wherein the method further comprises:
    receiving a selection of multiple keys; and
    selecting the key by attempting to decrypt the encrypted portion successively with each key of the multiple keys until said ascertaining has been has been performed with the valid key.

12. The computer program product of claim 7, wherein said receiving the selection of a valid key comprises:
    presenting to a user an identification of a plurality of keys previously entered to open a corresponding plurality of documents; and
    receiving from the user the selection of the valid key from the plurality of keys.

13. A data processing system comprising a computer readable memory unit, said memory unit containing computer readable program code stored therein, said program code configured to be executed in the data processing system to implement a method for selective decryption within an encrypted document, said method comprising:
    detecting an encrypted portion of a document, said encrypted portion having been selected and marked for decryption, said encrypted portion being an encryption of a text portion of the document, said text portion comprising a known character string that had been added to the text portion prior to the text portion being encrypted;

receiving a selection of a valid key configured to decrypt the encrypted portion;

ascertaining that an attempt to convert the encrypted portion into a decrypted portion of the document by decrypting the encrypted portion using the valid key was successful, said ascertaining comprising determining that the decrypted portion includes the known character string;

in response to said ascertaining, removing the known character string from the decrypted portion;

after said removing the known character string, displaying the decrypted portion.

14. The system of claim 13, said text portion comprising both said known character string and a random character string that had been added to the text portion prior to the text portion being encrypted, wherein the method further comprises:

in further response to said ascertaining, removing the random character string from the decrypted portion.

15. The system of claim 13, wherein the document comprises multiple copies of the encrypted portion, wherein each copy of the multiple copies is encrypted with a different encryption key, wherein said decrypting the encrypted portion comprises permanently decrypting the encrypted portion resulting in the decrypted portion being permitted to be edited, and wherein the method further comprises:

in response to said ascertaining, removing from the document each copy of the multiple copies of the encrypted portion such that only plain text of the decrypted portion is retained in the document.

16. The system of claim 13, wherein said decrypting the encrypted portion comprises decrypting the encrypted portion resulting in the decrypted portion being in read-only status and not being permitted to be edited.

17. The system of claim 13, wherein the method further comprises:

receiving a selection of multiple keys; and selecting the key by attempting to decrypt the encrypted portion successively with each key of the multiple keys until said ascertaining has been has been performed with the valid key.

18. The system of claim 13, wherein said receiving the selection of a valid key comprises:

presenting to a user an identification of a plurality of keys previously entered to open a corresponding plurality of documents; and receiving from the user the selection of the valid key from the plurality of keys.

* * * * *